United States Patent [19]

Pecora et al.

[11] Patent Number: 4,947,672
[45] Date of Patent: Aug. 14, 1990

[54] HYDRAULIC COMPRESSION TOOL HAVING AN IMPROVED RELIEF AND RELEASE VALVE

[75] Inventors: Gennaro L. Pecora; John B. Hoover, both of Manchester, N.H.; Steven M. Garramone, Upper Saddle River, N.J.; Henry Cielesz, Norwalk, Conn.

[73] Assignee: Burndy Corporation, Norwalk, Conn.

[21] Appl. No.: 332,839

[22] Filed: Apr. 3, 1989

[51] Int. Cl.[5] .............................................. B21J 9/12
[52] U.S. Cl. ...................... 72/453.16; 72/416; 81/301; 140/105; 137/512.3; 137/513; 60/477; 60/479; 60/482
[58] Field of Search ............... 81/301; 72/453.16, 416, 72/410; 140/113, 105; 137/522, 512.3, 513, 539; 60/477, 479, 482

[56] References Cited

U.S. PATENT DOCUMENTS

| | | | |
|---|---|---|---|
| 1,956,778 | 5/1934 | Slagel | 251/156 |
| 2,043,453 | 6/1936 | Vickers | 137/53 |
| 2,064,445 | 12/1936 | Nilson | 254/93 |
| 2,107,970 | 2/1938 | Wells | 60/52 |
| 2,138,125 | 11/1938 | Schultz et al. | 137/522 |
| 2,254,613 | 9/1941 | Matthysse | 140/113 |
| 2,618,929 | 11/1952 | Bidin | 60/52 |
| 2,696,850 | 12/1954 | Peterson | 140/113 |
| 2,729,063 | 1/1956 | Hoadley | 60/52 |
| 2,821,877 | 2/1958 | Swanson | 81/15 |
| 2,869,407 | 1/1959 | Swanson | 81/15 |
| 3,030,838 | 4/1962 | Klingler | 81/15 |
| 3,154,981 | 11/1964 | McDurmont | 81/15 |
| 3,272,083 | 9/1966 | Stoll | 137/522 |
| 3,389,717 | 6/1968 | Povalski et al. | 137/315 |
| 3,459,218 | 8/1969 | Cranage | 137/557 |
| 3,527,250 | 9/1970 | Thomas et al. | 137/522 |
| 3,627,367 | 12/1971 | Levy | 294/16 |
| 3,631,887 | 1/1972 | Fellbach et al. | 137/522 |
| 3,662,950 | 5/1972 | McIntosh et al. | 137/522 |
| 4,031,619 | 6/1977 | Gregory | 30/180 |
| 4,110,983 | 9/1978 | Sherman | 60/477 |
| 4,132,107 | 1/1979 | Suganuma et al. | 72/416 |
| 4,136,549 | 1/1979 | Lytle et al. | 72/453.16 |
| 4,151,720 | 5/1979 | Vanderstappen | 60/479 |
| 4,226,110 | 10/1980 | Suganuma | 72/416 |
| 4,339,942 | 7/1982 | Svensson | 72/453.16 |
| 4,366,673 | 1/1983 | Lapp | 60/477 |
| 4,478,479 | 10/1984 | Cherry et al. | 339/273 R |
| 4,581,894 | 4/1986 | Bush et al. | 60/482 |
| 4,589,272 | 5/1986 | Hutson | 72/453.16 |
| 4,671,063 | 6/1987 | Anaker | 60/458 |
| 4,823,588 | 4/1989 | Bussereau et al. | 72/453.16 |

OTHER PUBLICATIONS

Burndy Y35/Y35-2 Hydraulic Hypress Operating, Maintenance & Instructions, 1967.

*Primary Examiner*—David Jones
*Attorney, Agent, or Firm*—Perman & Green

[57] ABSTRACT

A valve for use in a hydraulic compression tool. The valve has a frame with a central chamber, a first inlet, a second inlet and a discharged outlet. A first gate is located at the first inlet. A plunger assembly having a first plunger member and a second plunger member are movably mounted in the central chamber with a spring biasing the plunger member against the second plunger member. The second plunger member has a conduit between the second inlet and the first plunger member. The valve has a first home position that substantially prevents fluid from flowing therethrough. The valve has a second manual release position wherein fluid can flow into the first inlet and out the discharge outlet. The valve also has a third automatic relief position such that in the event a predetermined maximum fluid pressure is exceeded a gate will open between the first plunger and the second plunger member to allow fluid to flow from the second inlet through the valve and out the discharge outlet.

18 Claims, 5 Drawing Sheets

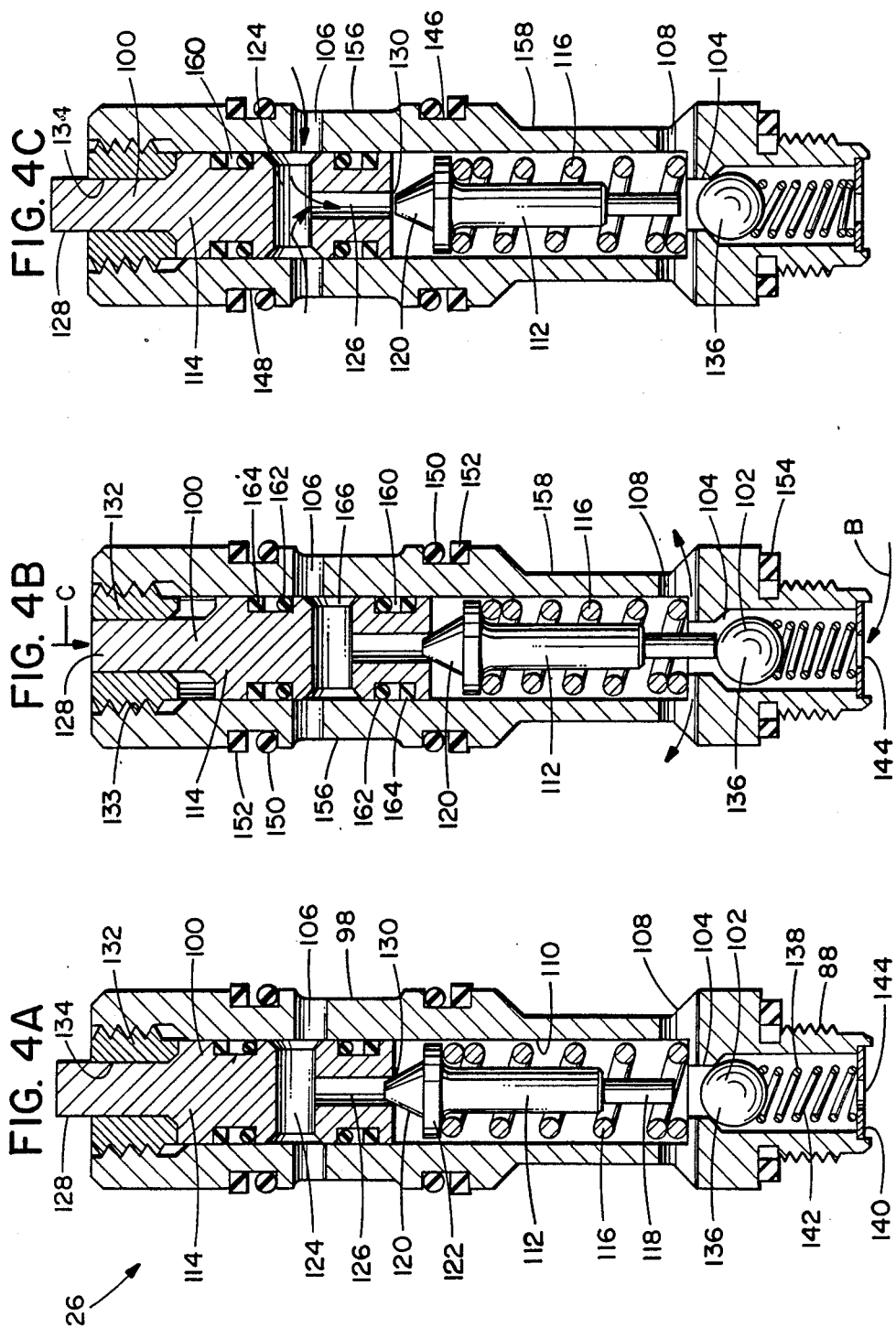

HYDRAULIC COMPRESSION TOOL HAVING AN IMPROVED RELIEF AND RELEASE VALVE

BACKGROUND OF THE INVENTION

1. Field of the Invention

This invention relates to compression tools and, in particular, a hand operated hydraulic compression tool having an improved relief and release valve.

2. Prior Art

A number of hydraulic compression tools have been developed for providing compression forces, such as about 12 tons of force, for compressing metal connectors about elements, such as wires, to be connected. The tools are generally provided with removable dies for accommodation of different types and sizes of connectors. The tools also conventionally include a pair of handles which are manipulated to provide the high pressure hydraulic piston advance with a control being provided for releasing the pressure upon completion of the connection compression. One type of control is a manual release valve for releasing the hydraulic pressure from a piston cylinder and returning the hydraulic fluid to a reservoir which conventionally may be disposed within one of the operating handles. It is further conventional in such tools to provide overload or pressure relief valves for controlling the maximum pressure applied to the connector to a preselected desired maximum pressure. It has been conventional to form in the body of a compression tool any movable valve member to effect the desired pressure regulation. U.S. Pat. No. 4,226,110 to Suganuma discloses one such hand operated hydraulic compression tool.

A problem exists with hand operated hydraulic compression tools of the prior art in that the tools have separate relief valves and release valves.

A further problem exists with prior art tools in that removal of a relief valve for repair or replacement requires the compression tool to be drained of hydraulic fluid and subsequently refilled with fluid requiring the bleeding of air from the hydraulic conduit system.

A further problem exists with prior art tools in that the separate relief valves and release valves have a relatively large number of parts and seals such as O-rings.

A further problem exists with prior art tools in that maintenance and repair of the tool can be relatively complicated due to the large number of parts and seals.

It is an objective of the present invention to provide a valve for use in a hydraulic compression tool having both manual fluid release capabilities as well as automatic fluid relief capabilities.

It is another objective of the present invention to provide a combined relief/release valve that is self-contained and relatively easy to manufacture.

It is another objective of the present invention to provide a hydraulic compression tool having a relief/release valve that is relatively easy to replace.

It is another objective of the present invention to provide a hydraulic compression tool having a relief/release valve that can have its seals replaced at one procedure.

It is another objective of the present invention to provide a relief/release valve that has relatively few parts.

SUMMARY OF THE INVENTION

The foregoing problems are overcome and other advantages are provided by a valve for use in a hydraulic compression tool, the valve having both manual pressure release and automatic pressure relief capabilities.

In accordance with one embodiment of the invention a hydraulic compression tool is provided having a body, a first handle with a fluid reservoir, a second handle, and a compression head having a clamping section, a cylinder, and a ram movably mounted within the cylinder. The body generally comprises frame means, first supply conduit means, hydraulic pump means, second return conduit means and a valve. The first conduit means is provided for supplying fluid from the fluid reservoir to the cylinder. The hydraulic pump means is connected to the first conduit means for forcing fluid into the cylinder. The second conduit means is provided for returning fluid from the cylinder to the fluid reservoir. The valve is connected to the second conduit means for controlling the flow of fluid therein. The valve has a first closed position, a second open position and a third relief position. The first closed position substantially prevents fluid from returning from the cylinder to the fluid reservoir. The second open position allows fluid in the cylinder to return to the fluid reservoir. The third relief position allows a limited amount of fluid to return to the fluid reservoir to prevent a predetermined maximum pressure at the cylinder from being exceeded whereby the valve can allow fluid pressure in the cylinder to be increased to advance the ram towards the clamping section, allow fluid pressure in the cylinder to be released to allow the ram to be retracted from the clamping section, and allow a relief of fluid pressure in the body to prevent the tool from exceeding a predetermined maximum pressure in the cylinder and thereby prevent damage to the tool.

In accordance with another embodiment of the invention, a valve is provided for use in a hydraulic compression tool. The valve comprises frame means, first gate means, and plunger means. The frame means has a first conduit means with a first inlet aperture means, a second inlet aperture means and a discharge aperture means. The first gate means is located at the first inlet aperture means and has a home position to prevent the flow of fluid therethrough. The plunger means is movably mounted in the first conduit means. The plunger means comprises a first plunger member, a second plunger member and means for biasing the first plunger member against the second plunger member in a home position. The second plunger member has a second conduit means between the second inlet aperture means and the first plunger member. The first and second plunger members form a second gate means at the second conduit means between the first and second plunger members, whereby the first gate means and the second gate means can substantially prevent fluid from passing through the first conduit means out the discharge aperture means when the first and second gate means are in a closed home position. When the plunger means is moved to a release position, the first gate means is opened to allow fluid to flow in said first inlet aperture means, through the first conduit means and out the discharge aperture means. When fluid pressure in the second conduit means exceeds a predetermined pressure, the first plunger member is moved away from the second plunger member to open the second gate means and allow fluid to flow from the second inlet aperture means, through the second conduit means, through the first conduit means and out the discharge aperture means to provide a combined manual release valve and automatic pressure relief valve.

BRIEF DESCRIPTION OF THE DRAWINGS

The foregoing aspects and other features of the invention are explained in the following description, taken in connection with the accompanying drawings wherein:

FIG. 4a is a cross sectional view of a relief/release valve in a first position.

FIG. 4b is a cross sectional view of the relief/release valve of FIG. 4a at a second position.

FIG. 4c is a cross sectional view of the relief/release valve of FIG. 4a in a third position.

DETAILED DESCRIPTION OF THE INVENTION

Figure 1:
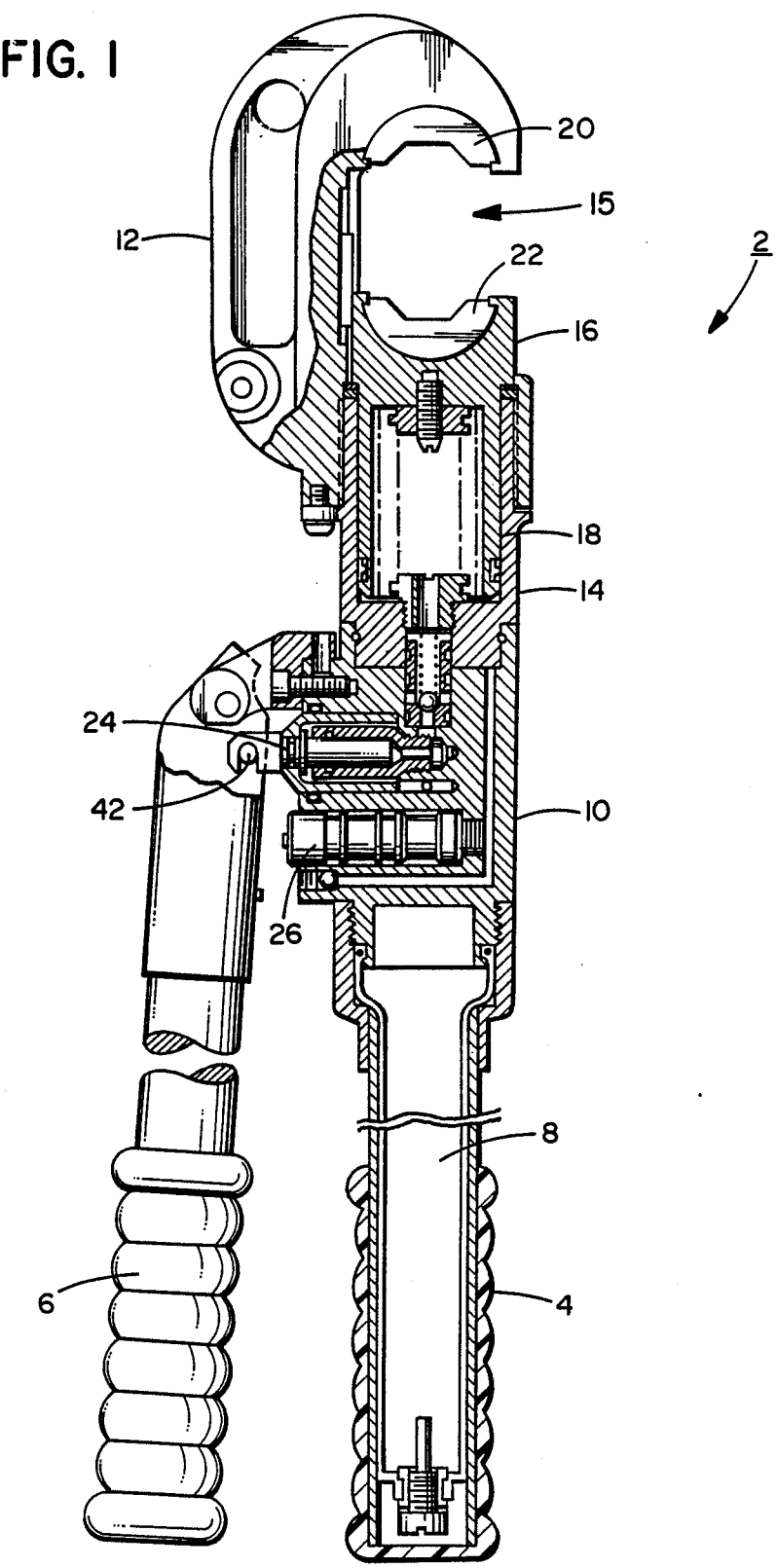
FIG. 1 is a partial cross sectional view of a hydraulic compression tool incorporating features of the present invention.

Referring now to FIG. 1, there is shown a partial cross sectional view of a hydraulic compression tool 2 incorporating features of the present invention. The tool 2 generally comprises a first handle 4 having a fluid reservoir 8 therein, a second handle 6, a body 10 and a compression head 12. The reservoir 8 is generally capable of holding a supply of hydraulic fluid, such as oil, and capable of supplying the fluid to the body 10. In the embodiment shown, the reservoir 8 is partially formed from a portion of the body 10. The second handle 6 is pivotally mounted to the body 10 for operating a hydraulic pump 24. The compression head 12 generally comprises a cylinder body 14 having a hydraulic cylinder 18 and an anvil or piston 16 movably mounted therein and a frame 13 with clamping section 15. The compression head 12 and the anvil 16 each also comprises means for mounting two dies 20, 22 for compressing articles such as metal connectors about elements, such as wires, to be connected. These dies 20, 22 are removable from the compression head 12 such that the compression head 12 can accommodate different types of dies for different connectors. The handles 4, 6 can be manipulated to operate the hydraulic pump 24 for providing fluid from the fluid reservoir 8 in the first handle 4 to the cylinder 18 to provide high pressure hydraulic advance of the anvil 16 towards the die 20. In the embodiment shown, the tool 2 comprises a combined hydraulic relief valve and release valve 26. In an alternate embodiment of the invention the anvil or ram 16 may be advanced without pumping the second handle 6, simply by rotating the first handle 4 as is known in the art.

Figure 2:
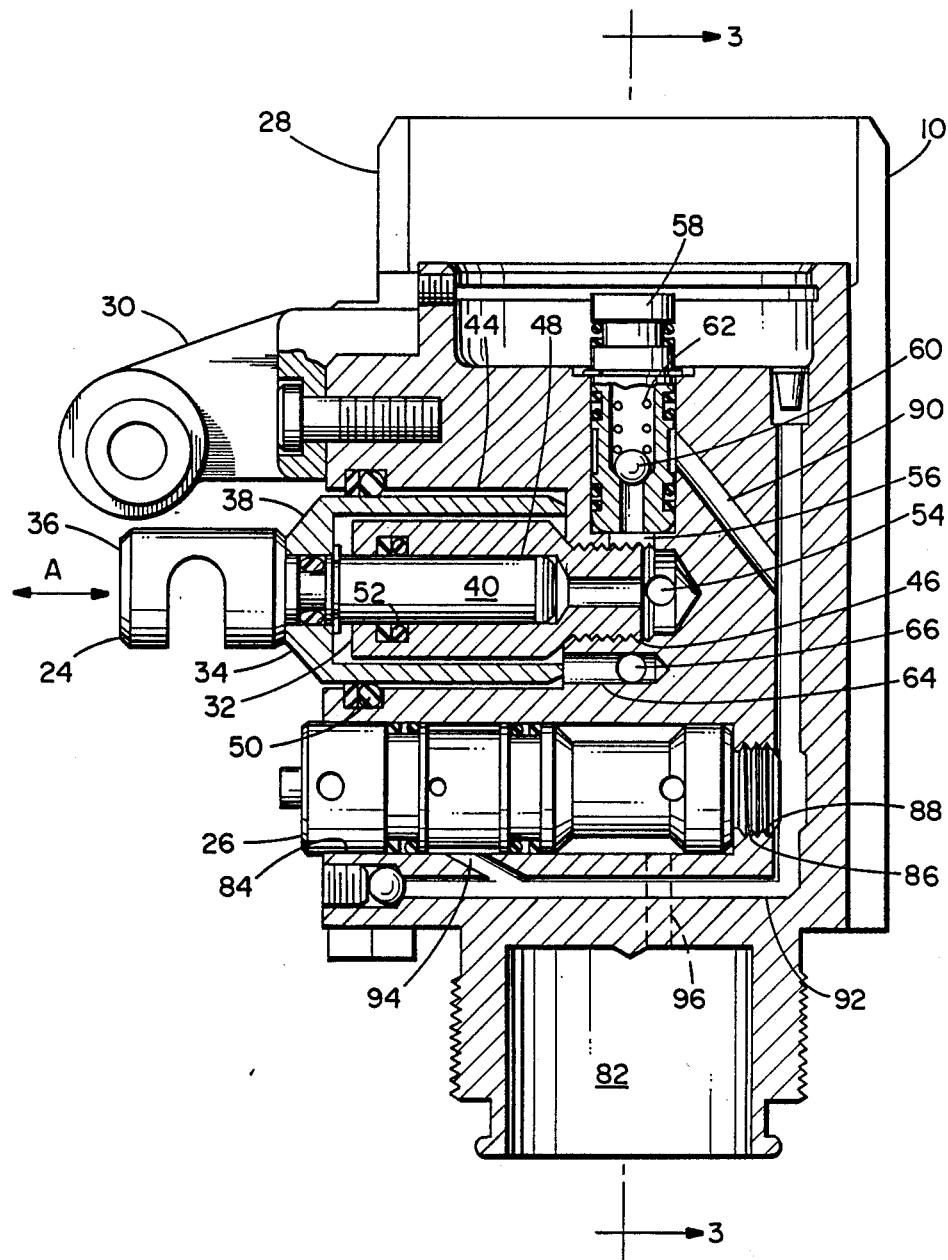
FIG. 2 is an enlarged cross sectional view of the body portion of the tool shown in FIG. 1.
Figure 3:
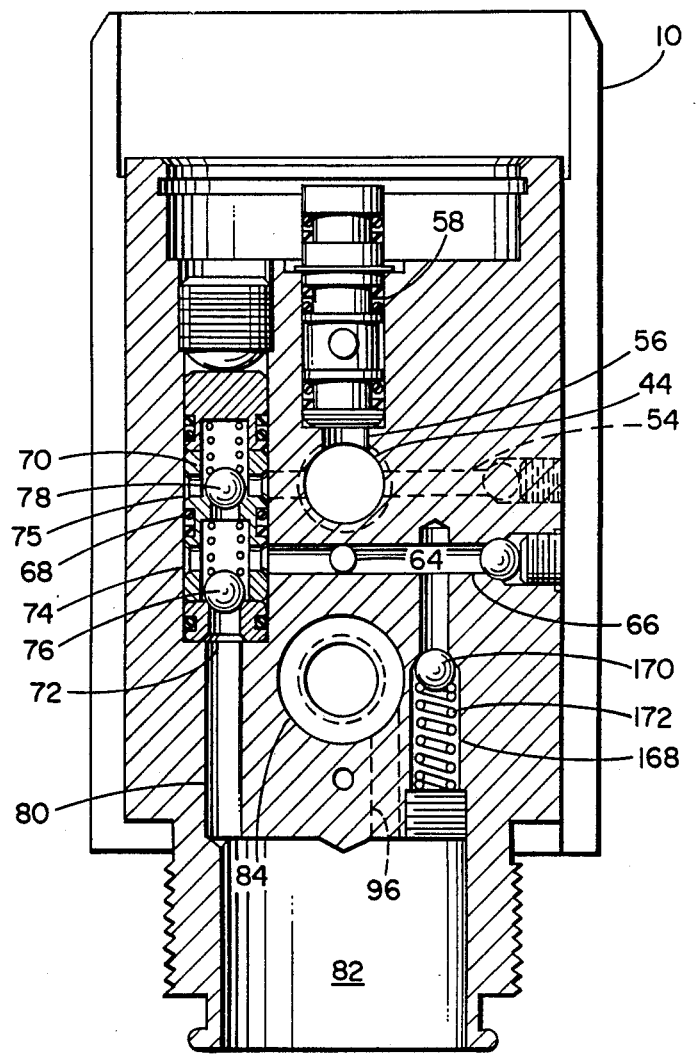
FIG. 3 is a cross sectional view of the body shown in FIG. 2 taken across line 3—3.

Referring also to FIG. 2, the body 10 of the tool will be further described. The body 10 generally comprises a frame 28, the hydraulic pump 24, the relief/release valve 26 and a plurality of conduits forming a supply conduit system and a return conduit system as will be described below. Fixedly mounted to the frame 28 is a pivot arm 30 which is provided for connecting the second handle 6 to the body 10. In the embodiment shown, the hydraulic pump 24 is a co-axial pump and is suitably mounted in the frame 28 and generally comprising a stationary portion 32 and a movable portion 34. The movable portion 34 generally comprises a top latch 36, an outer sleeve 38 and an inner piston 40. In a preferred embodiment of the invention the top latch 36 and inner piston 40 are formed as one piece. The top latch 36 can be pivotally connected to a pin 42 on the second handle 6 such that movement of the second handle 6 can move the movable portion 34 relative to the frame 28 as indicated by arrow A. The hydraulic pump 24 is suitably received in the frame 28 at a pump aperture 44 in the frame 28. The stationary portion 32, in the embodiment shown, generally comprises a threaded section 46 for mounting the pump 24 in a threaded section of the pump aperture 44 and a central aperture 48 for movement of the inner piston 40 therein. Suitable seals 50 and 52, such as O-rings are provided with the pump 24 to seal the movable portion 34 with the frame 28 and the inner piston 40 with the stationary portion 32, respectively. A fluid inlet conduit 54 communicates with the pump aperture 44 at the base of the stationary portion 32 for providing fluid to the pump. Movement of the second handle 6 away from the first handle 4 will cause the movable portion 34 to move outwardly from the frame 28 as indicated by arrow A with the piston 40 creating a vacuum in the central aperture 48 of the stationary portion 32. This vacuum will draw fluid into the pump 24 via the conduit 54. Movement of the second handle 6 back towards the first handle 4 will cause the movable portion 34 of the pump 24 to move back towards a home position as shown in FIG. 2. During this return movement, the piston 40 can then pump the fluid contained in the pump 24 out a conduit 56 past a directional flow check valve 58 into the cylinder 18. Suitable means are provided to prevent the fluid from exiting the inlet conduit 54 as will be described below. The check valve 58 generally comprises a ball 60 biased against an aperture to the conduit 56 by a spring 62. This configuration allows fluid pressure in the conduit 56 to displace the ball 60 from its seat by compressing the spring 62 and flowing into the check valve 58 and cylinder 18. However, this type of ball and spring check valve prevents fluid in the cylinder 18 and check valve 58 from reentering the pump 24. When fluid is not being passed through the check valve 58 from the pump 24, the spring 62 biases the ball 60 against its seat at the conduit 56. Thus, the ball 60 substantially blocks access to the conduit 56 from the cylinder 18. A channel 64 in the frame 28 provides a path for fluid to flow from a conduit 66 into the pump aperture 44 proximate the outer sleeve 38 of the stationary portion 32 and movable portion 34. The outer sleeve 38 also acts as a piston. Movement of the second handle 6 away from the first handle 4 causes the outer sleeve 38 to create a vacuum in the pump aperture 44. This vacuum can draw fluid into the aperture 44 via the conduits 64 and 66. Movement of the second handle 6 back towards the first handle 4 will cause the outer sleeve 38 to pump fluid back out the conduits 64 and 66 through a check valve assembly 68 (see FIG. 3), through conduits 54 and 56 and through check valve 58 and into the cylinder 18. The dual action of the piston 40 and outer sleeve 38 allows the ram 16 to be advanced relatively quickly with minimum pumps of the handles. When the dies 20 and 22 contact an article to be compressed, a relief valve 168 having a ball 170 and spring 172 (see FIG. 3) helps to deactivate or neutralize the pumping action of the outer sleeve 38. Generally, because the ram 16 is meeting some resistance by the article to be compressed, fluid pressure in the cylinder 18 is greater than the pressure required to open the relief valve 168. Although the check valve assembly 68 prevents fluid in the cylinder 18 from flowing through the relief valve 168, any fluid sucked into the aperture 44 by the outer sleeve can exit the body 10 via the relief valve 168. This allows the operator to compress an article relatively easily without substantial effort, but which nonetheless allows the ram 16 to be advanced to contact an article relatively quickly. The ram 16 can advance quickly through the use of the pumping action of both the piston 40 and outer sleeve 38. The ram 16 can compress an article relatively effortlessly by limiting the pumping action to only the inner piston 40 to compress an article. Referring also to FIG. 3, there is shown a cross sectional view of the body 10 taken along line 3—3 of FIG. 2. Both of the conduits 54 and 66 communicate with a check valve assembly 68. In the embodiment shown, the check valve assembly 68 generally comprises two ball and spring check valves mounted in a frame 70. The assembly 68 has one inlet 72 and two outlets 74 and 75. The first outlet 74 communicates with the conduit 66 and is located behind a first ball 76. The second outlet 75 communicates with the conduit 54 and is located at a second ball 78. The inlet 72 to the assembly 68 communicates with a conduit 80 which in turn communicates with a reservoir portion 82 of the body 10 that forms a portion of the fluid reservoir 8. With the fluid supply conduit system described above, fluid from the fluid reservoir 8 can be sucked by the pump 24 through conduit 80, check valve assembly 68, and conduits 54 and 66 into the pump 24 and pushed out of the pump 24 through conduit 56 and check valve 58 into cylinder 18 for moving the die piston 16.

Figure 5A:
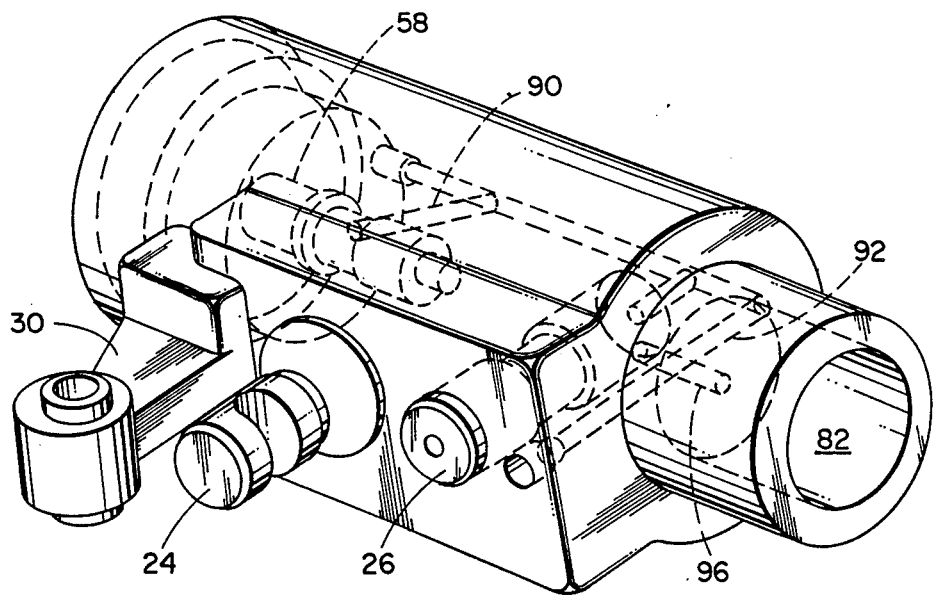
FIG. 5a is a schematic perspective view of the body showing fluid return conduits with the valve in a second release position.
Figure 5B:
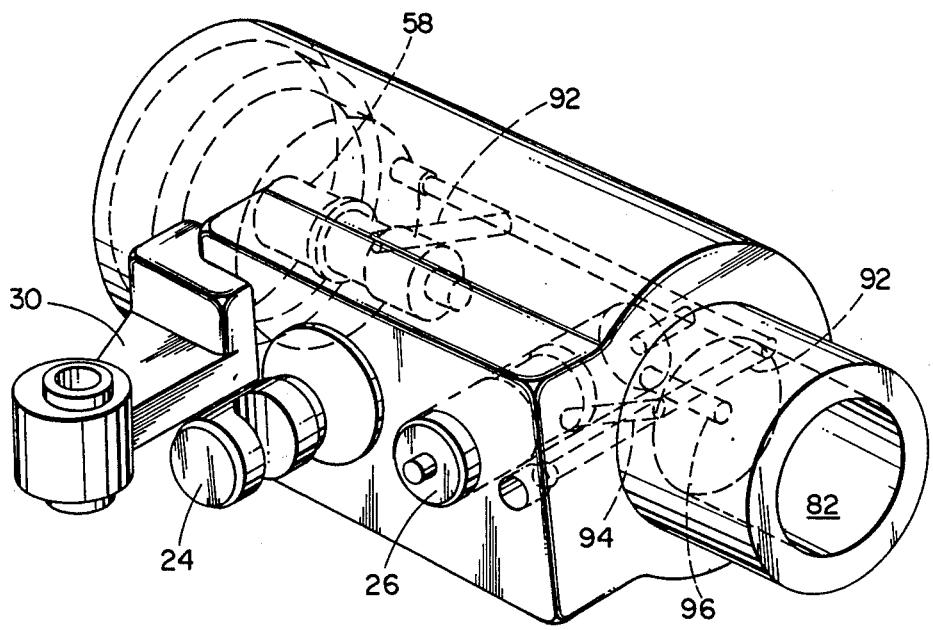
FIG. 5b is a schematic perspective view of the body shown in FIG. 5a showing fluid return conduits with the valve in a relief position.

As shown best in FIGS. 2, 5a and 5b the frame 28, in the embodiment shown, also comprises a valve receiving aperture 84 for mounting the relief/release valve 26. The valve receiving aperture 84 comprises a threaded section 86 for receiving a threaded section 88 of the valve 26. The frame 28 also comprises a system of conduits for returning fluid from the cylinder 18 through the valve 26 into the fluid reservoir 8. The fluid return conduit system generally comprises a first return conduit 90, a second return conduit 92, a third return conduit 94, and a fourth return conduit 96. The first conduit 90 generally communicates with the check valve 58 behind the ball 60 such that it communicates with the cylinder 18. The first conduit 90 also communicates with the second conduit 92. The second conduit 92 generally communicates with the valve receiving aperture 84 via the opening at the threaded section 86 and via the third conduit 94. The fourth conduit 96 generally communicates between the valve receiving aperture 84 and the reservoir portion 82 of the body 10. Thus, fluid from the cylinder 18 can pass through the first conduit 90, second conduit 92, eventually into the valve 26 and out the fourth conduit 96 back into the fluid reservoir 8.

Referring now also to FIGS. 4a, 4b and 4c, the combined relief/release valve 26 will be further described. The relief/release valve 26, in the embodiment shown, generally comprises a frame 98, a plunger assembly 100 and a first gate 102. The frame 98 generally comprises a first inlet aperture 104, a second inlet apertures 106, an outlet apertures 108 and a central chamber or conduit 110. The frame 98 can be made of any suitable material such as stainless steel. In the embodiment shown, the frame 98 is generally column shaped with two circular seats 146 and 148. Each seat has an O-ring seal 150 and a back-up ring 152 to prevent the O-rings 150 from being extruded under pressure. The seals 150 are generally capable of making a sealing engagement between the frame 98 of the valve 26 and the frame 28 of the body 10 in the valve receiving aperture 84. The seals 150 and back-up rings 152 can generally be removed from the body 10 with the valve 26 when the valve 26 is removed. The frame 98 also has a threaded section 88 for mounting the valve 26 with the threaded hole 86 in the body frame 28. A seal 154 is provided to seal the valve frame 98 with the body frame 28 proximate the hole 86. The valve frame 98 also has a threaded portion 133 at an opposite end of the frame 98 in the central chamber 110. The first inlet aperture 104 is generally a circular hole with an enlarged section 142 passing through the frame 98 and a relatively narrow section proximate the central chamber 110. The second inlet apertures 106 generally comprises two circular holes that pass through the frame 98 into the central chamber 110. A first circular ring shaped depression 156 extends around the outside of the valve frame 98 proximate the second inlet apertures 106. The outlet apertures 108 generally comprises two circular holes that pass through the frame 98 into the central chamber 110 proximate the first inlet aperture 104. A second circular ring shaped depression 158 extends around the outside of the valve frame 98 proximate the outlet apertures 108. The first circular ring shaped depression 156 allows the valve 26 to be inserted into the valve receiving aperture 84 without the need for precisely aligning the second inlet apertures 104 with the third return conduit 94. The second circular ring shaped depression 158 allows the valve 26 to be inserted into the valve receiving aperture 84 without the need for precisely aligning the outlet apertures 108 with the fourth return conduit 96.

The plunger assembly 100 generally comprises a first plunger member 112, a second plunger member 114 and a spring 116. The first plunger member 112 generally comprises a first end 118 located proximate the first gate 102, a second end 120 located proximate the second plunger member 114 and a ledge portion 122. The second end 120 generally has a cone-like shape for reasons as will be described below. The spring 116, at the home position shown in FIG. 4a, is slightly compressed between a portion of the frame 98 and the ledge portion 122 of the first plunger member with a portion of the first plunger member 112 passing through the coiled spring 116. In the home position shown in FIG. 4a, the first end 118 of the first plunger member 112 is spaced slightly from the first gate 102. The second plunger member 114 generally comprises a first conduit 124, a second conduit 126 and an extension 128. The second plunger member 114 also comprises two circular seal depressions 160 for housing two O-ring seals 162 and cooperating back-up rings 164. The seals 160 can provide sealing engagement between the second plunger member 114 and the interior walls of the frame central chamber 110. The second plunger member 114 also comprises a circular ring shaped depression 166 around the outside of the second plunger member 114 proximate the first conduit 124. The first conduit 124 generally communicates with the second inlet apertures 106 of the frame 98. The second plunger member ring shaped depression 166 allows the first conduit 124 to communicate with the second inlet apertures 106 without the need for precise alignment. In addition, the ring shaped depression 166 is relatively large to provide communication between the second plunger member first conduit 124 even when the second plunger member 114 is moved from its home position to a release position shown in FIG. 4b, as will be described below. The second conduit 126 generally communicates between the first conduit 124 and, in the home position shown for FIG. 4a, terminates in the central chamber 110 at the second end 120 of the first plunger member 112. The second conduit 126 generally has an aperture 130 in which a portion of the second end 120 of the first plunger member 112 sits therein at the home position shown in FIG. 4a. The second plunger member extension 128 generally extends past the end of the valve frame 98 and is intended to be used as a button for manual release. Both the first plunger member 112 and the second plunger member 114 are movably mounted in the central chamber 110 of the frame 98. The spring 116 generally biases the first plunger member 112 against the second plunger member 114. A threaded nut 132 is mounted at the threaded portion 133 of the frame and has an aperture 134 to allow the extension 128 to pass therethrough. The threaded nut 132, in addition to allowing the extension 128 to extend through its aperture 134, generally provides a barrier to contain the first plunger member 112, the second plunger member 114 and the spring 116 in the central chamber 110 of the valve. In addition, the threaded nut 132 cooperates with the first plunger member 112 and the second plunger member 114 such that the spring 116 is slightly compressed or preloaded at the home position shown in FIG. 4a.

The first gate 102, in the embodiment shown, generally comprises a ball 136, a spring 138 and a retaining washer 140 contained in the enlarged section 142 at the first inlet aperture 104. The washer 140, in the embodiment shown, has a central aperture 144 for passage of fluid therethrough. The spring 138 is slightly compressed or preloaded between the washer 140 and the ball 136 to bias the ball 136 against the first inlet aperture 104 such that fluid is prevented from entering the central chamber 110 through the first inlet aperture 104 in the home position shown in FIG. 4a.

Referring to FIG. 4b, the valve 26 is shown in a manual fluid release position. As is shown in this embodiment, the extension 128 has been depressed thereby moving the first plunger member 112 and second plunger member 114 towards the first gate 102 by compressing the spring 116. Any suitable means can be used to depress the extension 128 such as a depress lever on the second handle 6. In the manual release position shown, the first end 118 of the first plunger member 112 generally projects into the first inlet aperture 104 to displace the ball 136 from its seat at the first inlet aperture 104. With the ball 136 displaced from its seat against the first inlet aperture 104 the first gate 102 is in an open position such that fluid from the second return conduit 92 can pass through the washer aperture 144 as indicated by arrow B, through the enlarged portion 142, through the first inlet aperture 104, into the central chamber 110 and out the outlet apertures 108 to return fluid via the fourth return conduit 96 back to the fluid reservoir 8. If the force, indicated by arrow C, against the extension 128 is removed, the spring 116 is able to bias the first plunger member 112 and the second plunger member 114 back to the home position shown in FIG. 4a. With the first end 118 of the first plunger member 112 being removed from the first inlet aperture 104 the spring 138 of the first gate 102 can bias the ball 136 back into its seat against the first inlet aperture 104 to prevent fluid from flowing therethrough as shown in the home position of FIG. 4a. The manual release operation of the valve 26 allows the valve to cooperate with the fluid return conduits (see FIG. 5A) to allow fluid in the cylinder 18 to flow back into the fluid reservoir 8 thereby allowing the piston 16 to be retracted to increase the distance between the two dies 20 and 22 and thereby open the compression head 12 for removal of a compressed item or placement of an item to be compressed into the area into the two dies 20 and 22.

Referring to FIG. 4c, the valve 26 is shown in a fluid relief position. The fluid relief position for the valve is generally provided for limiting the maximum pressure applied to an item to be compressed, such as a connector, to a preselected maximum pressure. Thus, the valve 26 is capable of regulating fluid pressure to prevent damage to an item to be compressed and damage to the tool 2. The relief position shown is thus depended upon fluid pressure in the cylinder 18. Because the first, second and third return conduits 90, 92 and 94 communicate with the cylinder 18, the fluid pressure in the first, second and third return conduits 90, 92 and 94 is substantially the same as fluid pressure in the cylinder 18. When a predetermined maximum pressure, such as 10,000 psi, is reached the valve 26 allows fluid to flow into the valve and out the outlet apertures 108 until the fluid pressure at the cylinder 18 diminishes below the predetermined maximum pressure at which point the valve 26 will close to prevent fluid from automatically flowing therethrough. As described above, the third return conduit 94 communicates with the second inlet apertures 106 of the valve which in turn communicates with the first and second conduits 124 and 126 of the second plunger member 114. The first plunger member 112 has a cone shaped second end 120 which, due to the biasing action of the spring 116, is biased in the aperture 130 of the second conduit 126 at the home position shown in FIG. 4a. When the predetermined maximum pressure is exceeded, fluid in the first and second conduits 124 and 126 of the second plunger member 114 presses against the cone shaped portion of the first plunger member second end 120 to move the first plunger member 112 away from the second plunger member 114 to open a gate at the second conduit aperture 130 to allow fluid to flow from the third return conduit 94 into the second inlet apertures 106 through the second plunger member first and second conduits 124 and 126, into the central chamber 110 of the valve and finally out the outlet apertures 108 into the forth return conduit 96 to the fluid reservoir 8 (See FIG. 5B). When sufficient fluid has flowed through this relief operation through the valve 26, the spring 116 is once again able to bias the first plunger member 112 against the second plunger member 114 with the cone shaped second end 120 returning to its seat at the aperture 130 to close the second gate formed between the first and second plunger members and thereby return the valve 26 to the home position shown in FIG. 4a.

The present invention obviously has many advantages over the devices described in the prior art. The present invention provides a valve for both manual release of fluid pressure as well as automatic fluid pressure relief. The combined relief/release valve has less parts than the two separate valves that were needed in devices of the prior art. In addition, the relief/release valve of the present invention is relatively easy to replace, easy to manufacture, self-contained and simpler in construction than the separate relief valves and release valves known in the prior art. In addition, unlike prior art devices which required the removal of fluid from a compression tool when a relief valve is removed or replaced and subsequently the prior art tool had to be bleed to remove air in the hydraulic system when the fluid was replaced, the present invention allows for a relatively simple and easy replacement or removal of the relief/release valve without the need for removing the fluid from the hydraulic system and bleeding the system, thus greatly easing repair and service to a compression tool. In addition, unlike multiple valves in prior art devices, the present invention allows for repair or replacement of all seals at one time.

In alternate embodiments of the present invention, any suitable supply conduit system and return conduit system may be provided. In addition, any suitable hydraulic pump may be provided. Any suitable type of gates may be provided at the first and second gates to the valve 26. Any suitable directional flow valves or check valves may also be used.

It should be understood that the foregoing description is only illustrative of the invention. Various alternatives or modifications can be devised by those skilled in the art without departing from the spirit of the invention. Accordingly, the present invention is intended to embrace all such alternatives, modifications and variances which fall within the scope of the appended claims.

What is claimed is:

1. A hydraulic compression tool having a body, a first handle with a fluid reservoir, a second handle, and a compression head having a clamping section, a cylinder, and a ram movably mounted with said cylinder; said body comprising:
    body frame means;
    first conduit means for supplying fluid from said fluid reservoir to said cylinder;
    hydraulic pump means connected to said first conduit means for forcing fluid into said cylinder;
    second conduit means for returning fluid from said cylinder to said fluid reservoir; and
    a combined hydraulic fluid relief/release valve connected to said second conduit means for controlling the flow of fluid in said second conduit means, said valve comprising a valve frame means having a center chamber means with a first inlet aperture means, a second inlet aperture means and a third outlet aperture means;
    first gate means at said first inlet aperture means; and
    plunger means movably mounted in said center chamber means, said plunger means having a first plunger member and a second plunger member and forming a second gate means therebetween, said second gate means being located between said second inlet aperture means and said third outlet aperture means, said valve having a first closed position, a second open position and a third relief position, said first closed position substantially preventing fluid from returning from said cylinder to said fluid reservoir, said second open position allowing fluid in said cylinder to return to said fluid reservoir, and said third relief position allowing a limited amount of fluid to return to said fluid reservoir to prevent a predetermined maximum pressure at said cylinder from being exceeded whereby said valve can allow fluid pressure in said cylinder to be increased to advance said ram towards said clamping section, allow fluid pressure in said cylinder to be released to allow said ram to be retracted from said clamping section, and allow a relief of fluid pressure in said body to prevent the tool from exceeding a predetermined maximum pressure in said cylinder and thereby prevent damage to the tool.

2. A tool as in claim 1 wherein said second handle is pivotally connected to said frame means and said pump means whereby movement of said second handle relative to said first handle pumps said pump means.

3. A tool as in claim 1 wherein said first conduit means comprises means for substantially restricting flow in said first conduit means to a first direction from said fluid reservoir to said cylinder.

4. A tool as in claim 1 wherein said valve comprise at least two inlet aperture means and at least one discharge aperture means.

5. A tool as in claim 4 wherein said second conduit means comprises a first section between said cylinder and said valve and a second section between said valve and said fluid reservoir, and said at least two inlet aperture means communicate with said first section and said at least one discharge aperture means communicates with said second section.

6. A tool as in claim 1 wherein said first conduit means and said second conduit means are joined proximate said cylinder.

7. A tool as in claim 1 wherein said plunger means comprises a spring to bias said first plunger member away from said first gate means and to bias said first plunger member against said second plunger member.

8. A tool as in claim 7 wherein said second plunger member has an extension that extends out of said frame means which can be depressed to compress said spring, move said first and second plunger members to open said first gate means and allow fluid to flow through said first gate means from said first inlet aperture means through said center chamber means to said outlet aperture means.

9. A tool as in claim 8 wherein said second plunger member has a conduit means therethrough between said second inlet aperture means and said second gate means such that fluid at a predetermined pressure in said second plunger member can open said second gate means by moving said first plunger member away from said second plunger member, compressing said spring and fluid can flow through said second gate means until fluid pressure in said second plunger member conduit is exceeded by the force exerted by said spring and said spring moves said first plunger member against said second plunger member to close said second gate means.

10. A valve for use in a hydraulic compression tool, the valve comprising:
    frame means having a first conduit means with a first inlet aperture means, a second inlet aperture means and a discharge aperture means;
    first gate means at said first inlet aperture means, said first gate means having a home position to prevent flow of a fluid therethrough;
    plunger means movably mounted in said first conduit means, said plunger means comprising a first plunger member, a second plunger member and means for biasing said first plunger member against said second plunger member in a home position, said second plunger member having a second conduit means between said second inlet aperture means and said first plunger member, said first and second plunger members forming a second gate mean at said second conduit means between said first and second plunger members, whereby said first gate means and said second gate means can substantially prevent fluid from passing through said first conduit means out said discharge aperture means when said first and second gate means are in a closed home position, when said plunger means is moved to a release position said first gate means is opened to allow fluid to flow in said first inlet aperture means, through said first conduit means and out said discharge aperture means, and when fluid pressure in said second conduit means exceeds a predetermined pressure said first plunger member is moved away from said second plunger member to open said second gate means and allow fluid to flow from said second inlet aperture means, through said second conduit means, through said first conduit means and out said discharge aperture means to provide a combined manual release valve and automatic pressure relief valve.

11. A valve as in claim 10 wherein said first gate means comprises a plug means and a spring means, said spring means biasing said plug means against said first aperture means at said home position.

12. A valve as in claim 10 wherein said biasing means comprises a spring means biasing said first plunger member away from said first gate means.

13. A valve as in claim 12 wherein said spring means and said first plunger member bias said second plunger member away from said first gate means and said second plunger member has an extension that extends out of said frame means which is depressible for moving said plunger means to a release position.

14. A valve as in claim 10 wherein said first plunger member has a first end for opening said first gate means and a second end with a first portion suitably sized and shaped for mating with a discharge aperture of said second conduit means to form said second gate means.

15. A valve as in claim 10 wherein said second conduit means and said second inlet aperture means are always in communication with each other.

16. A hydraulic compression tool having a body, a first handle with a fluid reservoir, a second handle, and a compression head having a clamping section, a cylinder, and a ram movably mounted with said cylinder; said body comprising:
a body frame;
a first conduit for supplying fluid from said fluid reservoir to said cylinder;
a hydraulic pump connected to said first conduit for forcing fluid into said cylinder;
a second conduit for returning fluid from said cylinder to said fluid reservoir; and
a valve connected to said second conduit for controlling the flow of fluid in the second conduit, said valve comprising:
 (a) a valve frame having an interior chamber with a first inlet, a second inlet and an outlet;
 (b) a first gate at said first inlet; and
 (c) plunger means movably mounted in said chamber, said plunger means having a first plunger with a cone shaped tip and a second plunger with a channel therethrough, said cone shaped tip being biased against said channel in a home position and forming a second gate therebetween, said second gate being located between said second inlet and said outlet.

17. A valve for use in hydraulic compression tool, the valve comprising:
a housing having a first inlet, a second inlet and an outlet;
a first gate at said first inlet;
means for opening said first gate comprising first and second plunger movably mounted in said housing such that said plungers can be depressed to open said first gate and allow fluid to flow from said first inlet to said outlet; and
means for allowing a limited amount of fluid to flow from said second inlet to said outlet comprising said second plunger having a channel therein between said second inlet and said first plunger, a spring biasing said first plunger against said second plunger, and said first plunger having tip adapted to close said channel when said first plunger is biased against said second plunger such that fluid pressure can open a second gate formed between said tip of said first plunger and an opening to said channel in said second plunger to allow fluid to flow therebetween and exit said outlet until fluid pressure at said second inlet is reduced and said spring once again biases said first plunger against said second plunger to close said second gate.

18. A valve for use in a hydraulic tool comprising:
a frame with a first inlet, a second inlet, an outlet, and a conduit connecting said inlets and outlet;
a first gate at said first inlet;
a second gate at said conduit between said second inlet and said outlet;
means for manually opening said first gate;
means for automatically opening said second gate in response to a predetermined hydraulic pressure at said second inlet; and
means for removably mounting said frame in a hydraulic tool receiving aperture such that the valve can be mounted to and removed from the tool as a substantially modular unit.

* * * * *